7/14/87    XR    4,679,591

United States Patent [19]
Maue et al.

[11] Patent Number: 4,679,591
[45] Date of Patent: Jul. 14, 1987

[54] SERVOVALVE DRIVE ELECTRONICS IMPROVEMENTS

[75] Inventors: Dale N. Maue, Minnetonka; Richard A. Lund, Chaska, both of Minn.

[73] Assignee: MTS Systems Corporation, Eden Prairie, Minn.

[21] Appl. No.: 840,402

[22] Filed: Mar. 17, 1986

[51] Int. Cl.$^4$ .......................................... F15B 13/044
[52] U.S. Cl. .................... 137/624.13; 73/665; 91/35; 137/625.65; 251/129.09
[58] Field of Search ............... 73/664, 665; 91/35; 137/624.13, 625.65; 251/129.09, 129.1

[56] References Cited

U.S. PATENT DOCUMENTS

| | | | |
|---|---|---|---|
| 3,874,407 | 4/1975 | Griswold | 251/129.05 X |
| 4,336,745 | 6/1982 | Lund | 91/35 |
| 4,537,077 | 8/1985 | Clark et al. | 73/665 |
| 4,593,719 | 6/1986 | Leonard | 137/625.64 X |

*Primary Examiner*—Gerald A. Michalsky
*Attorney, Agent, or Firm*—Kinney & Lange

[57] ABSTRACT

The present invention provides a circuit for obtaining higher accuracy and total system response for complex mechanical impedance loads, such as earthquake simulators, and in particular to compensate for limitations in controlling the actual valve spool displacement and adequately stabilizing and controlling it at high frequencies. The improvement circuit includes a state variable filter to extend the band width of servovalve actuation frequencies by adding a lead compensation signal compensating for servovalve hydraulic responses. The output of the first filter circuit then in turn feeds a summing junction where the spool displacement feedback is provided, and the output of the summing junction or circuit is provided with the output from an additional filter which cleans up the signal by filtering out noise and insures that the phase of stabilizing signals is proper. The final input signal that is then fed into a unique drive system utlizing two amplifiers connected as current pumps to independently drive the electrical motor coils that in turn drive the valve spool to insure adequate current for driving the spool in opposite directions at high frequencies.

12 Claims, 6 Drawing Figures

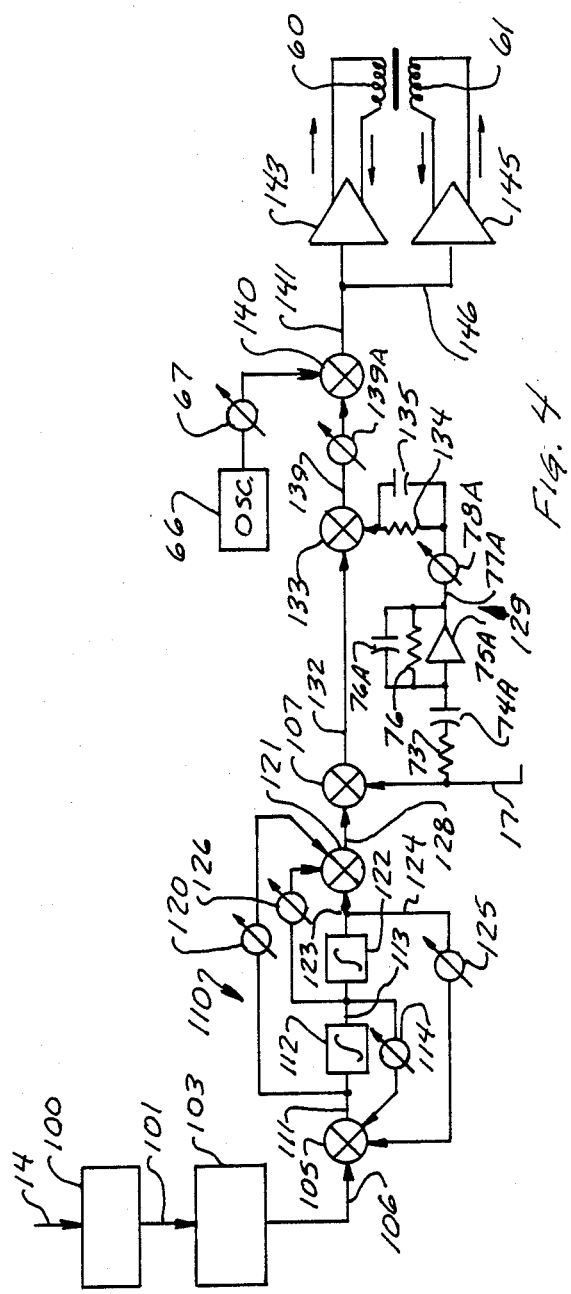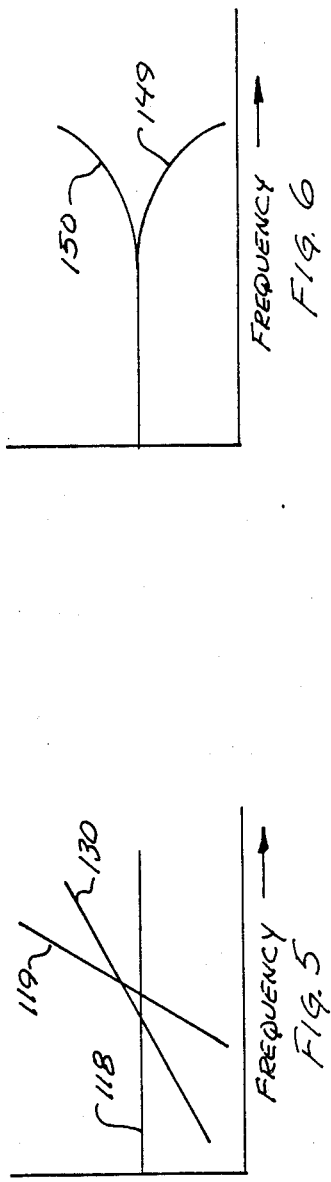
Fig. 4
Fig. 6
Fig. 5

SERVOVALVE DRIVE ELECTRONICS IMPROVEMENTS

BACKGROUND OF THE INVENTION

1. Field of the Invention

The present invention relates to circuitry for providing optimum performance in high frequency dynamic servovalve controls.

2. Description of the Prior Art

Compensation circuitry for improving the peformance of servovalves has been advanced in the past. For example, U.S. Pat. No. 4,336,745 provides a servovalve linearization circuit for compensating for the basic orifice equation nonlinearity of the servovalve. The compensation circuit in U.S. Pat. No. 4,336,745 measures the pressure required by the load and then compensates the servovalve flow command signal based on the required pressure. This statically linearizes the servovalve device.

U.S. Pat. No. 4,537,077 adds a load dynamic compensation signal for specimen disturbances that are caused during displacement control into the servovalve command signal by utilizing the actuator pressure and acceleration and a derived compensating signal for the compliance factor of the oil in the actuator. The circuits of the two aforementioned patents preferably can be used in series, with the load dynamic compensation circuit of U.S. Pat. No. 4,537,077 added into the signal that is delivered to the compensation circuitry of U.S. Pat. No. 4,336,745.

A further servovalve limitation is caused by the lag of the servovalve spool response, which then becomes a significant factor in overall performance when the more apparent and larger effects have been compensated for with the circuitries just described.

SUMMARY OF THE INVENTION

A circuit for providing compensation inputs to a command signal to a servovalve by adding compensation signals from a state variable filter which add a lead compensation signals at high frequency, compensating for the servovalve hydraulic resonance, and a series connected circuit for filtering noise and providing a low noise stabilizing signal summed to the command signal to the servovalve. Individual current amplifiers for the two separate directional servovalve motor coils are then used so that the current signal is adequate to drive the servovalve spool at the higher frequencies achievable with the system.

The circuit permits fine tuning the compensation signal to the servovalve to obtain very smooth and precise operation of servovalve spools even when operating on objects such as earthquake simulator tables that require high, very dynamic oscillatory forces controlled by the input signal.

BRIEF DESCRIPTION OF THE DRAWINGS

FIG. 4 is a schematic representation of the circuit of the present invention that provides compensation necessary for fine tuning and accurate operation;

FIG. 5 is a graphic representation of the compensation signal which is provided in a first portion of the circuit of FIG. 4 plotted in relation to frequency; and FIG. 6 is a graphic illustrative representation of valve spool roll off with frequency and the final control signal provided with the present circuitry to compensate for roll off.

DETAILED DESCRIPTION OF THE PREFERRED EMBODIMENTS

Figure 1:
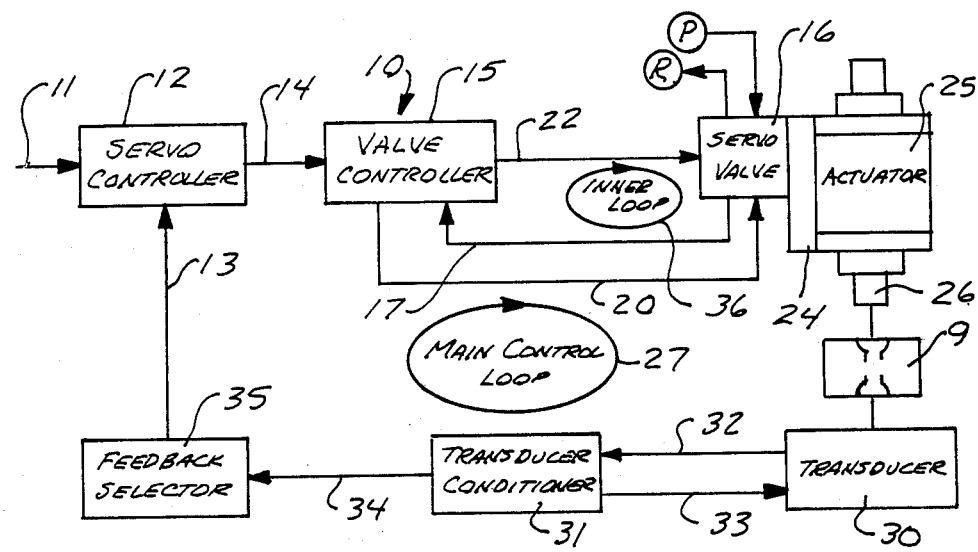
FIG. 1 is a schematic view of a typical prior art servo hydraulic system, controlling loads on a speciman table.

In referring to FIG. 1, the typical prior art hydraulic servovalve closed loop system indicated generally at 10 includes a program input line 11 that has a desired program, which is to provide for loads on a specimen indicated generally at 9, such as an earthquake simulating table. This program input can generally be a dynamic, variable signal, for example a signal reversing, such as that where an earthquake is simulated wherein a dynamic, irregular varying, high frequency signal representing earth displacement during an earthquake is provided. The program inputs are well known in the art using various signal inputs. A servo controller 12, which is also well known comprises essentially a summing circuit which compares the programmed input signal on line 11 with a feedback signal (force or displacement for example) along a line 13, and provides a DC error signal on line 14 as discussed in U.S. Pat. No. 4,336,745. The prior mentioned patents generally comprise improvements in the servo controller 12 as opposed to the valve controller.

Figure 3:
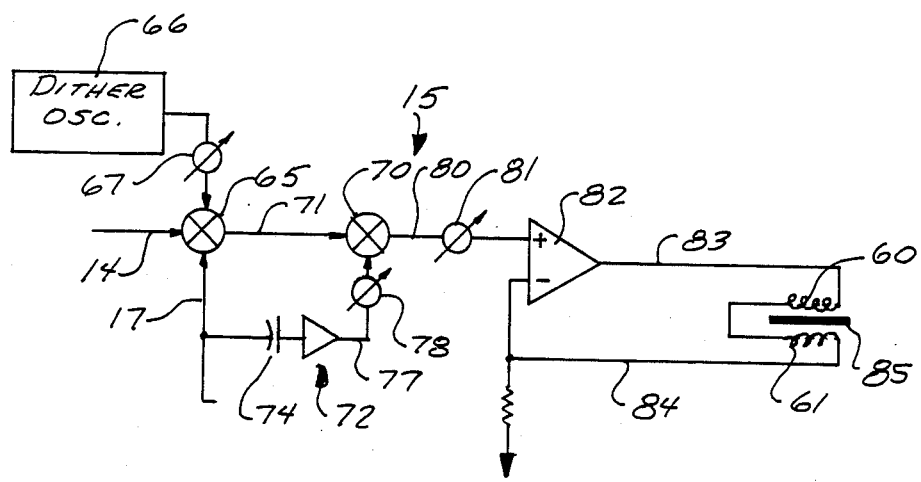
FIG. 3 is a schematic view of a typical prior art stabilization circuit commonly in use, showing a current sense amplifier drive for the servovalve motor coils that is conventional.

A valve controller circuit 15, which is shown in FIG. 3 in more detail, compares the actual spool position of a spool in a servovalve 16, as indicated along a feedback line 17 from an LVDT or displacement transducer with the error signal on line 14. LVDT's are conventional feedback devices. An excitation line for the LVDT indicated at 20 is also provided from the valve controller 15.

The output signal of the valve controller 15 is the actual control signal on line 22 to the servovalve coils, in the servovalve 16, which control the displacement of the servovalve spool. A hydraulic manifold 24 is provided in a conventional manner. An actuator 25, which is a double acting hydraulic actuator, is controlled by the servovalve 16 for reciprocal movement. A rod indicated at 26 provides the output reciprocal movement and is coupled to the specimen 9, which may be a table moved in opposite directions as shown in U.S. Pat. No. 4,537,077.

A transducer 30 of selected design is used to measure the displacement of the specimen, or provide other suitable feedback. A transducer conditioner circuitry 31 is merely electronic circuitry that receives the feedback signal along a line 32, and also provides transducer excitation along a line 33 to the transducer. The transducer may also be a load cell or LVDT to provide either load or displacement signals. The conditioned feedback signal is fed along a line 34 to a feedback selector circuit 35 which for example can select between displacement or load feedback signals, and then the selected feedback signal is provided to the servo controller 12. The feedback selector 35 also is termed a mode selector switch, and for example a mode switch used in connection with a hydraulic press is disclosed in U.S. Pat. No. 4,458,189, for switching between force commands and displacement command for the servovalve system.

This typical circuit of FIG. 1 is illustrated for background purposes, and the main control loop represented at 27 comprises the inputs and feedbacks to the servo controller 12, while what is called an inner control loop 36 is the loop formed by the valve controller 15, the servovalve 16, the feedback line 17, and the control signal line 22. It is in the inner control loop that the fine tuning of servo control systems is obtained with the present invention.

Figure 2:
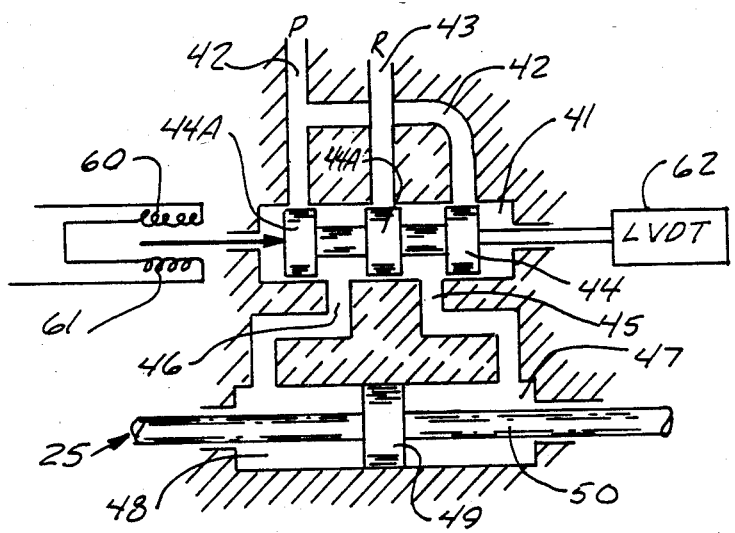
FIG. 2 is a schematic representation of a servovalve spool showing the position of the spool relative to internal ports.

Also by way of reference, in FIG. 2, a typical servovalve is shown schematically, and includes a housing 40 that has an interior bore 41 with suitable pressure passageways 42,42, leading from a pressure source. The valve has a return passageway 43, and a valve spool 44 that has suitable lands 44A thereon. The spool controls flow to output ports indicated at 45 and 46, which provide flow to interior chambers 47 and 48 of an actuator. The actuator includes a piston 49 which defines the chambers 47 and 48. A rod 50 is provided for output of the hydraulic actuator, which is indicated at 25 in FIG. 1. The servovalve device of FIG. 2 is prior art as well. The showing is provided to illustrate the spool for regulating flow between one of the pressure passageways 42 in the respective ports 45 and 46 to cause the piston 49 to reciprocate under control of the input signal on line 22. The spool 44 is operated through the use of a pair of coils indicated schematically at 60 and 61 which are coupled to a current drive system. The LVDT circuit, that is the displacement transducer of the spool circuit is shown at 62 and is coupled to the spool at one end for providing the displacement feedback signal.

A conventional prior art valve controller 15 circuit is shown in FIG. 3. The DC error signal along line 14 is the signal from the outer loop, comprising the signal from servo controller 12 and feeds into a summing junction 65. The summing junction 65 has one input that is from a dither oscillator indicated at 66, through a gain adjustment potentiometer 67 to provide a small superimposed oscillatory signal on the DC command signal on line 14 to keep the valve spool "live"e command signal is an oscillating signal for providing opposite directing loads on a specimen, either by way of shaking or vibrating the specimen, or loading it in two directions.

The summing junction 65 also receives the LVDT feedback from the servovalve along line 17, as was explained, and the output of summing junction 65 is sent to a stablization summing junction 70. The stablization summing junction sums the signal on line 71 from summing junction 65, and also sums a differentiated feedback signal from a differentiator 72. The differentiator 72 receives the spool displacement feedback signal from the LVDT along line 17, and passes this signal through a capacitor 74 to the input of amplifier 75. The output of this amplifier is fed along a line 77 through an adjustable stabilization potentiometer 78 to an input of the summing junction 70, and this then provides a signal that damps the signal on line 71 if the spool tends to start uncontrolled oscillation. This signal provides stabilization and is conventionally done.

The output from the summing junction 70 is then provided along a line 80 through a gain adjustment 81 in a conventional manner to a current sensing amplifier 82 that provides current along a line 83 through coils 60 and 61, which are coupled in series through a return line 84 to the inverting input of the amplifier 82. A current sensing resistor is provided between line 84 and circuit common as well. The signal on line 80, passed through gain device 81, is fed to the noninverting input of this amplifier.

Thus as the signal along line 80 reverses in direction, the amplifier will change the direction of current flow through the coils 60 and 61 to reciprocate the spool motor, which is represented at 85.

From the prior art structure shown in FIG. 3, additional compensation circuitry has been added from U.S. Pat. Nos. 4,336,745 and 4,537,077. Thus, in FIG. 4, which shows the improvement of the present invention, the circuit from U.S. Pat. No. 4,537,077 which is a load dynamic compensation circuit, is represented by box 100 and is preferably placed to receive the input from the line 14 and provide the compensation. The output from circuit 100 shown by line 101 is preferably put into a circuit represented at 103 that is from U.S. Pat. No. 4,336,745 for basic orifice equation nonlinearity. This is one example of how the two prior art circuits may be connected. Under other conditions, different connections may be preferred. The output from compensation circuit 103 is then provided to a summing junction 105 along a line 106. The circuit of FIG. 3 is then replaced with the balance of the circuitry shown in FIG. 4.

The compensation circuitry shown in FIG. 4 is to provide a controllable compensation without merely adjusting the gain to a point where the servovalve becomes unstable. If too much gain is provided in the normal circuit, the servovalve will tend to oscillate uncontrollably and be too sensitive to changes of the input drive signal. Thus, a first portion of the correction circuit of the present invention indicated generally at 110 includes summing junction 105 and provides an output through compensation circuitry to a second summing junction 107. Circuit 110 is a filter circuit which provides anticipating additive signals to compensate for lag in the servovalve spool, that is, the failure of the spool to follow faithfully the input signal. For example, the input signal is a voltage signal which is to cause a proportional displacement of the servovalve spool from a null position. If the frequency of the input signal is high and the peak signal is, say one volt, the spool may not reach a displacement proportional to one volt before the input signal changes and the spool changes direction. Thus, the spool lags, and precise control is not obtained. The summing junction 105 provides an output along a line 111, and feeds a first integrator circuit 112, that provides an output on a line 113. This is the first integration of the signal on line 111, and this signal is then fed back to the summing junction 105 through a loop damping gain control potentiometer 114 which insures that stability is achieved at high frequencies. The signal from gain control 114 is summed with the DC signal on line 106. Referring to FIG. 5, the graphical representation shows a DC signal 118, and a second order signal variation with increasing frequency is indicated by line 119. This type of signal is present on line 111.

The second order signal on line 111 is also connected through a high pass gain control potentiometer 120 to a summing junction 121. The high pass control 120 provides an additive or anticipatory signal, which increases with frequency, to summing junction 121.

The signal on line 113 is provided through a band pass gain control 126 to summing junction 121 as well. The band pass gain control 126 provides an additive first order signal as generally represented at 130 in FIG.

5 for illustrative purposes and has a greater effect at lower frequencies (mid range), as shown. The output from summing junction 121 is fed along a line 128 to the summing junction 107.

Output line 123 connects directly to summing junction 121. The signal on line 113 is also provided to a second integrator circuit 122, which provides the second integration output signal on output line 123, and this signal also is fed through a line 124 and gain control potentiometer 125 to the summing junction 105.

The gain control 125 is used for limiting the frequency range of compensation, or in other words set the frequency where the signal from the high pass control will become ineffective. The set frequency might be about twice or more the frequency where the valve spool starts to "roll off".

The adjustment 125 could be replaced by providing an adjustable gain at the output of summing junction 105, which will provide the same effect of limiting the frequency range of compensation of circuit 110. When adjusting the limit of the frequency range of compensation using a gain control on the output of summing junction 105, the forward gain of circuit 110 is maintained and will be affected as it is when using control potentiometer 125. Using control potentiometer 125 will require some adjustment of gain, such as adjusting a gain control 139A, for example.

The signal from the high pass control 120 is proportional to the square of the frequency so as the frequency increases (below the frequency set by control 125) the additional signal increases substantially to provide the added signal needed for the spool to reach the displacement required by the control signal before a reversal of movement occurs.

The mid range frequencies are compensated by the output of the band pass control 126. With only the high pass additive signal, the control signal in mid range would attenuate. With the additive signal from the band pass control precise spool displacement across the desired range of operation is insured.

The summing junction 107 corresponds essentially to summing junction 65 in FIG. 3, except that it has additional additive inputs along line 128 from summing junction 121. The spool displacement feedback line 17 is summed at junction 107.

A filter circuit 129 is provided between feedback line 17 and a summing junction 133, which also is connected to the output line 132 from summing junction 107. The filter circuit 129 includes an amplifier 75A coupled to line 17 through a resistor 73 and a series capacitor 74A. The amplifier 75A has an output line 77A and a parallel connected resistance 76 and capacitor 76A coupled as a feedback from its output line 77A to its input. The line 77A is connected through a gain control 78A to a parallel connected resistor 134 and capacitor 135 which are also connected to summing junction 133. This filter is a three pole filter circuit for filtering noise and providing stabilization as a function of the rate of spool displacement. Resistor 73 in series with capacitor 74A provides a roll off characteristic with frequency increase and the parallel resistors and capacitors 76,76A and 134,135 also cause a roll off of the rate of spool displacement signal with frequency increase and also insures proper phase of the signal into summing junction 133. The stabilization signal from circuit 129 is not merely a rate signal in that the circuit is no longer just a differentiator as shown in FIG. 3.

The output of the summing junction 133 in turn provides an output along a line 139 through a gain control 139A to summing junction 140. A dither signal is also inputted along a line 67 (it is a conventional dither oscillator as shown at 66) to summing junction 140. The summing junction 140 adds the dither signal that is desired for accurate servovalve control.

The final drive to the servovalve, however, is connected differently, and includes two high current output operational amplifiers, such as Linear No. 759 amplifiers, hooked as current pumps. The line 141 is connected to a first amplifier 143 that pumps current through the coil 60 in proportion to the signal on line 141, and a second current amplifier 145 is connected to pump current through coil 61 independently as a function of the signal on level 141. These current pumps are conventional devices, but the connecting to the individual coils for controlling the direction of movement of the servovalve spool provides adequate current, in proportion to the voltage input signal, for driving the servovalve spool at high frequencies. When the signal on line 141 is zero, the currents from both amplifiers drive the spool to a null position. Positive or negative signals on line 141 cause currents to flow in both amplifiers so the generated force from each coil 60 and 61 is additive to insure rapid operation.

The circuit 110 provides a filter for second order ($f^2$) lead compensation for servovalve lag as well as the first order compensation for mid range frequencies.

The correction added to the signal on line 106 to provide a very accurate compensation. The controls 114 and 125 provide adjustments for circuit damping and determining operation frequency. The circuit between summing junctions 107 and 140 provides stabilization with a low noise wide band width signal, based upon the spool rate of displacement through the circuit 129, including parallel resistor 134 and capacitor 135.

The drive motor for the servovalve spool drive amplifier stage represented by amplifiers 143 and 145 independently drive coils for moving the servovalve spool in opposite directions with adequate drive current available, to take the best advantage of the signals provided by the compensation circuitry.

FIG. 6 is for illustrating a simulated relationship between the roll off of the spool response with frequency increase simulated at curve 149 and the compensation output signal represented by line 150. As frequency increases, (the horizontal line represents frequency), the drive signal 150 (on line 141) will rise after a frequency set by control 120 and the circuit components are selected to substantially mirror the expected spool roll off which is simulated by the line 149. The spool roll off limits the frequency response of the entire system. By providing the anticipatory signal through a circuit 110 and adding in a clean filtered signal that is dependent upon a rate of spool displacement, and also has some roll off characteristics, and having individual current pump amplifiers for individually driving the coils for moving the spool in its opposite direction at high response rates, optimum results are achieved. The present circuitry is a fine tune circuit which is most effective when used with additional compensation circuitries, such as the known circuitry that compensates for orifice nonlinearities and for load dynamics.

Although the present invention has been described with reference to prferred embodiments, workers skilled in the art will recognize that changes may be made in form and detail without departing from the spirit and scope of the invention.

What is claimed is:

1. A circuit for compensating an input signal to a servovalve having a spool, which servovalve spool has a response roll off characteristic with frequency, wherein the servovalve spool is driven in displacement by electric current signals acting through drive coils with an input error signal that is a dynamic signal, at a frequency (f) including:

first circuit means for providing a correction factor signal to the error signal which is a function of the square of the frequency of the error signal;

means for summing the correction factor signal and the error signal with a stabilization signal that is a function of rate of displacement of the servovalve spool; and means for driving coils of a servovalve in proportion to the output of the means to sum.

2. The circuit of claim 1 including second circuit means as part of the first circuit means for providing an additive signal to the means for summing which is a function of the frequency of the error signal.

3. The circuit of claim 2 and means for controlling the frequency at which the correction factor signal becomes effective.

4. The circuit of claim 3 wherein the means for driving coils of a servovalve comprise current pump means for separately driving individual coils of such servovalve, each of said coils being operable to drive the servovalve in the same direction from a null position as a function of the signal from the last mentioned means for summing.

5. The improvement of claim 4 wherein said first circuit means includes an input signal from which the frequency squared signal is provided, and means for integrating the input signal, the means for integrating having the integrated outputs coupled through adjustable controls to the means for summing.

6. The circuit of claim 5 and means for summing the input signal and the signal from the means for integration.

7. The improvement for driving a servovalve spool having at least two separate coils for reciprocating the servovalve spool in response to input currents varying at a frequency, comprising means for providing an analog command signal, a separate current pump amplifier means for driving each separate coil as a function of the command signal and pumping current from each amplifier means through the respective coil and back to such amplifier means and coupled so the currents in each coil are additive in acting on the servovalve spool to control movement of the servovalve spool.

8. The apparatus of claim 7, including means for providing compensation to the command signal for driving said amplifier means, comprising a first compensation circuit for providing a variable lead compensation signal as a function of frequency squared of said command signal, and a second filter circuit including means for providing a signal that is a function of servovalve spool displacement summed with said lead compensation signal to provide a compensated command signal to both of the amplifier means.

9. A circuit for compensating an input signal to a servovalve having a spool, which servovalve spool has a response rolloff characteristic with increasing frequency, and wherein the servovalve spool is driven and displaced by a dynamic current input error signal to operate servovalve drive means at a frequency comprising:

first circuit means including means for integrating the input error signal twice;

second means for providing a signal which is a function of the square of the frequency of the input error signal;

third means for providing a signal which is a function of the frequency of the error signal; and means to sum the signals from the means for integrating twice, the second means and the third means to provide a compensated signal for controlling the servovalve spool movement.

10. The circuit as specified in claim 9, and means to add a stabilization signal that is a function of the rate of displacement of the servovalve spool to said compensated signal before the compensated signal is provided to control the servovalve spool.

11. The circuit of claim 10 and means for controlling the frequency of the input error signal across which the signal from said second means is effective.

12. The circuit of claim 10 wherein said servovalve includes a pair of coils, each associated to drive the servovalve spool, and separate current pump amplifier means for individually driving current through the individual coils, respectively, as a function of the same compensated signal, each of said coils and its associated current pump amplifier means being operable to drive the servovalve in the same direction from a null position as a function of the same command signal.

* * * * *